United States Patent Office 2,941,558
Patented June 21, 1960

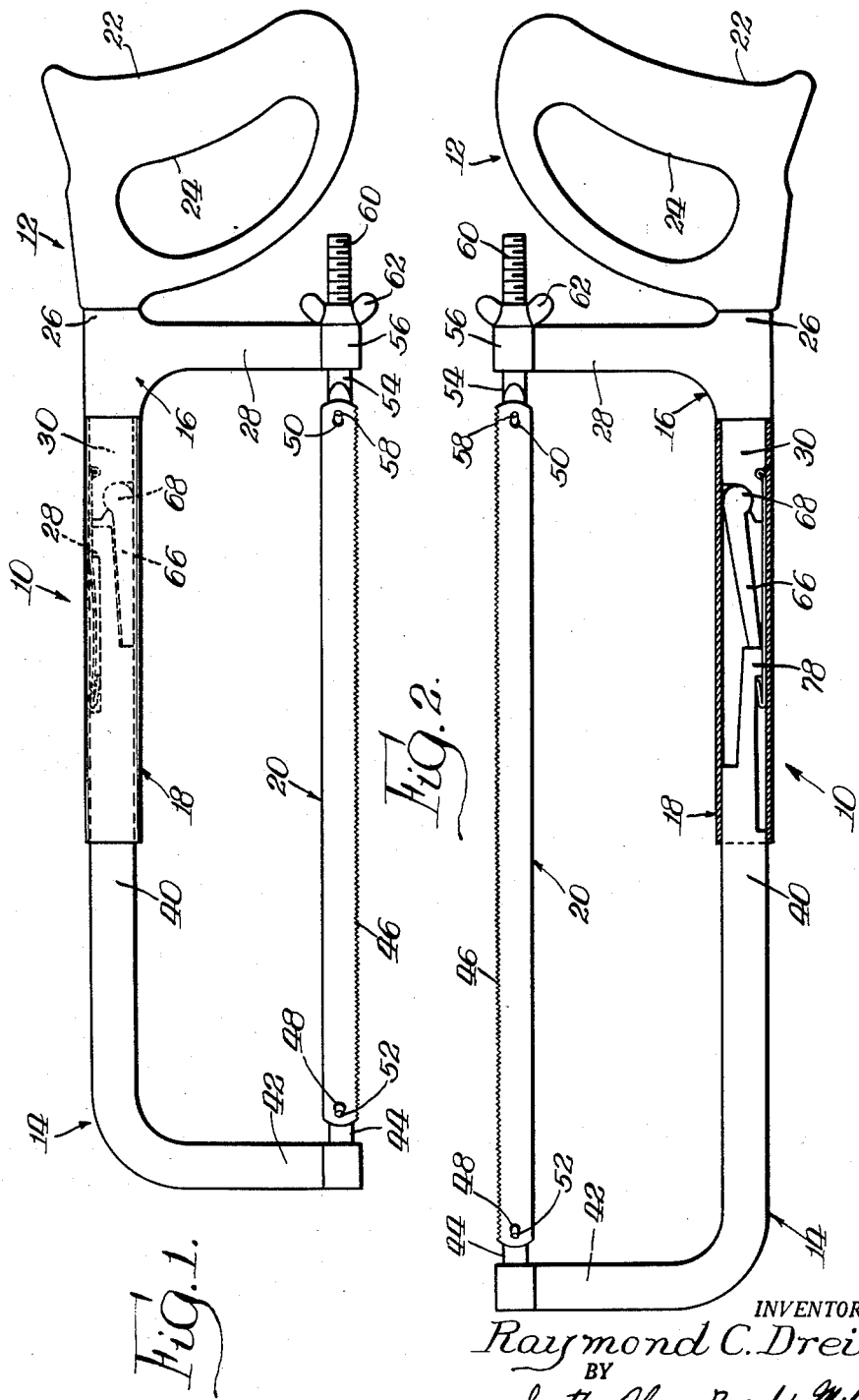

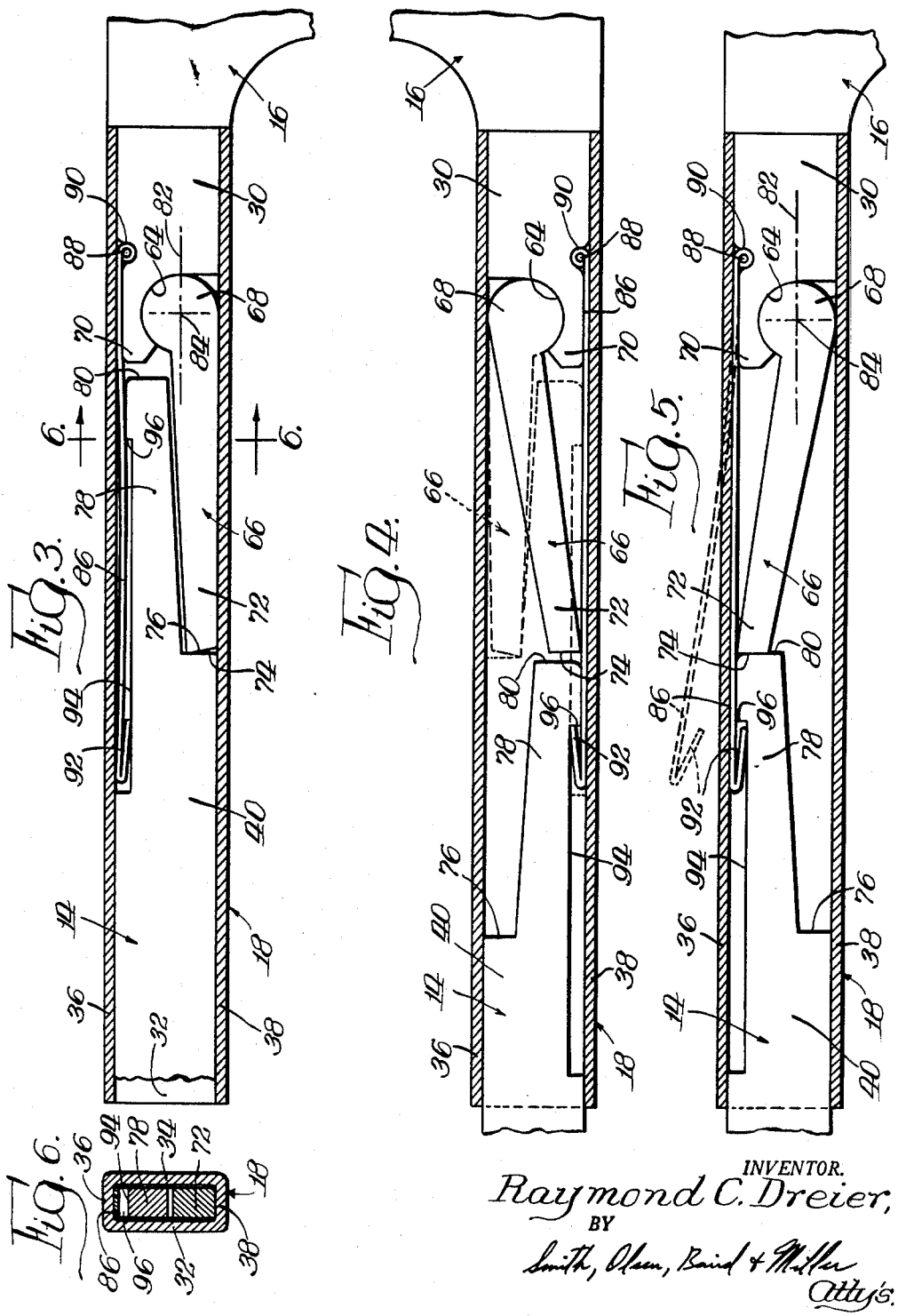

2,941,558

ADJUSTABLE SAW FRAME

Raymond C. Dreier, 6930 South Shore Drive, Chicago, Ill.

Filed Oct. 10, 1956, Ser. No. 615,121

10 Claims. (Cl. 145—34)

This invention relates to saw frames and particularly to a readily adjustable hacksaw frame.

The present invention is directed to saw frames and particularly hacksaw frames having easily removable saw blades detachably mounted thereon. The principles of this invention are particularly applicable to hacksaw frames and, accordingly, will be described as applied thereto but it is to be understood that other tool frames adapted to receive detachable tensioned working members can profitably incorporate the principles of the invention therein.

During use of a hacksaw it is frequently desirable to change the cutting blade, and often it is desirable to change the length of cutting blade mounted thereon. Two popular lengths of hacksaw cutting blades are so called "10 inch" and "12 inch" blades. To achieve proper operation of the blade it is necessary that the blade be held under substantial tension with the sides thereof lying in planes. Accordingly, the frame supporting the blade must be sufficiently strong to hold the blade under the proper tension and must be capable further of maintaining the blade with the sides thereof disposed in planes and not curved or skewed.

Therefore, it is an important object of the present invention to provide an improved saw frame and particularly an improved hacksaw frame which can be readily adjusted to receive different lengths of saw blades.

Another object of the invention is to provide a saw frame readily adjustable to accommodate different lengths of blades, which is rigid and firm in support of the blade in all adjusted positions thereof whereby to hold the associated blade under suitable tension and with the sides thereof lying in planes.

Yet another object of the invention is to provide a readily adjustable hacksaw frame in which the length of the frame is adjustable without the use of any tools.

In connection with the foregoing object it is a further object to provide a hacksaw frame in which the members locking the frame in the desired adjusted position are gravity operated and are held in operative position by tensioning of the blade.

Still another object of the invention is to provide a readily adjustable hacksaw frame in which the parts providing adjustment of the frame are held in operative position without the use of pins, bolts or the like whereby to provide an adjustable hacksaw frame which can be more easily and economically manufactured.

These and other objects and advantages of the present invention will be apparent from the following description of a preferred embodiment thereof, taken with the accompanying drawing, wherein:

Figure 1 is a side elevational view of a hacksaw constructed in accordance with the present invention, the adjusting members being shown in dotted lines and placed in the shortened position;

Figure 2 is a similar view of the hacksaw, but showing the same after it has been inverted and its frame extended to receive a longer blade which is shown mounted thereon, a portion of the longitudinally extending element of the frame having been cut away to illustrate a latch or link therein that is arranged to fall by gravity into position to retain the frame in its extended position when the frame has been extended and temporarily inverted as shown;

Figure 3 is an enlarged longitudinal view in cross section of a portion of the longitudinally projecting frame of the saw with the frame parts of the saw in the position occupied when the saw frame is adjusted, as in Figure 1, to receive short length blades;

Figure 4 is a view similar to Figure 3 but showing in solid lines the position of the parts when the frame has been extended, as in Figure 2, to receive longer blades upon being inverted to cause the frame to be locked in its extended position, the parts being shown in broken lines in the position occupied before extension of the frame;

Figure 5 is a view similar to Figure 3 but showing the saw parts in the position occupied after the frame has been extended and locked in the extended position, the frame being illustrated as having been returned to its normal upright operative position; and Figure 6 is a transverse cross sectional view taken substantially along the line 6—6 in Figure 3.

The principles of the present invention are particularly applicable to hacksaw frames and will be described as applied thereto although it is to be understood that other tool frames used to hold working parts under longitudinal tension can also profitably incorporate the principles of the present invention therein. Referring to Figure 1 of the drawing there is shown a hacksaw generally designated by the numeral 10 made in accordance with and incorporating the principles of the present invention. Hacksaw 10 includes a handle 12, a first frame member 14, a second frame member 16, a tube 18 telescopically receiving ends of frame members 14 and 16 and a saw blade 20. For purposes of illustration, the hacksaw inch blades in the shortened position and to receive 12 10 has been illustrated as being of the type to receive 10 inch blades in the extended position.

Handle 12 may be of the usual grip type including a palm receiving surface 22 and a finger receiving aperture 24. A handle receiving projection 26 is provided on the frame member 16 to receive and mount the handle 12. Frame member 16 also includes a downwardly extending leg 28 which is adapted to receive and support one end of blade 20 as will be described more fully hereinafter. Extending laterally from the leg 28 and in general alignment with projection 26 is another projection 30 which extends into and is received by the tube 18.

As is best illustrated in Figure 6 of the drawing, the tube is substantially rectangular in cross section and includes a pair of normally vertically disposed and parallel sides 32 and 34 connected by two parallel shorter sides 36 and 38, the corners thereof being rounded. The projection 30 on the frame member 16 extends into one end of the tube 18, as explained above, and is shaped complementary to the inner cross section of the tube 18, the portions of the frame member 16 immediately adjacent the tube 18 generally conforming to the outer periphery thereof to provide a smooth joint between the tube 18 and the frame member 16. Any suitable fastening method such as welding or brazing may be used to interconnect in a permanent manner the frame member 16 and the tube 18.

The frame member 14 includes a pair of legs 40 and 42 which are disposed substantially perpendicular to each other. The leg 40 has a cross section shaped to be received within the other end of the tube 18 and is telescopically received thereby. The lower end of the leg 42, as viewed in Figure 1, has mounted thereon a blade retainer 44.

The manner of mounting the blade 20 upon the frame members 14 and 16 will now be described. Blade 20 is provided with the usual cutting edge 46. For best operation of the cutting edge 46, the blade 20 must be supported under tension and preferably with the longitudinally extending side surfaces thereof disposed in parallel planes and not twisted or skewed in any manner. There further is provided in each end of the blade 20, retainer receiving apertures 48 and 50. The retainer 44 mounted on the leg 42 includes a pin 52 adapted to project through the aperture 48 and is disposed substantially perpendicular to the plane of the longitudinally disposed sides of blade 20. The blade retainer mounted on the lower end of the leg 28 is adjustable longitudinally and includes a bolt 54 slidingly received in a cylindrical member 56 provided on the lower end of the leg 28. The end of the bolt 54 disposed toward the blade retainer 44 is provided with a pin 58 adapted to extend into aperture 50 and to be substantially perpendicularly disposed to the plane of the sides thereof. The other end of bolt 54 is threaded as at 60 and threadedly receives a wing nut 62 thereon. Wing nut 62 is disposed on the side of the leg 28 opposite the pin 58 and bears against the adjacent wall of the cylindrical member 56.

Blade 20 is mounted upon the hacksaw frame by first adjusting the wing nut 62 upon the bolt 54 so that the pins 52 and 58 can be inserted into the blade apertures 48 and 50, respectively. Wing nut 62 is then turned upon the threaded portion 60 until it bears against the adjacent surface of the leg 28 after which it is tightened thereby to place the blade 20 under tension.

Referring now specifically to Figure 3 of the drawing, the construction of the extensible frame will be described in greater detail. Projection 30 on the frame member 16 is provided with a concave, part-cylindrical bearing surface 64 which is adapted to receive and retain a brace or latch member generally designated by the numeral 66. One end of the latch member 66 is provided with a convex, part-cylindrical pivot portion 68 which is adapted to have a portion of its cylindrical surface in bearing contact with part-cylindrical surface 64 on the projection 30. The surface 64 terminates in a hook portion 70 which, in conjunction with the wall 38 of tube 18, serves pivotally to interconnect the projection 30 and the latch member 66.

Extending outwardly from the pivot portion 68 of the latch member 66 is an elongated finger 72 which terminates in an abutment end 74 adapted to engage the leg 40 of the frame member 14. When the hacksaw is to be adjusted for the shorter or 10 inch blades, the end 74 abuts against a shoulder 76 formed adjacent the lower side of leg 40. With the parts in the position illustrated in Figure 3, tightening of the wing nut 62 to apply tension on the blade 20, urges the leg 40 of the frame member 14 toward the projection 30 of the frame member 16. Movement of the leg 40 toward the projection 30 is limited and is stopped by the latch member 66 and particularly by the abutment end 74 engaging the shoulder 76 of the leg 40 and the pivot portion 68 engaging the surface 64 on the surface 30. Tube 18 firmly holds the leg 40 and the projection 30 in alignment in all directions perpendicular to the longitudinal axis thereof, and the latch member 66 effectively limits the distance that leg 40 and the projection 30 can approach each other. Accordingly, a rigid frame is provided to support the blade 20.

In order to provide an extended frame to receive, for example, 12 inch blades, a projection 78 is provided on the leg 40. Projection 78 terminates in an abutment end 80 which preferably lies in a plane disposed substantially perpendicular to the longitudinal axis of the blade 20 and is positioned two inches from the shoulder 76. When the latch member 66 is pivoted to the upper position, as shown in Figure 5, the abutment end 74 thereof engages and stops the abutment end 80 on the projection 78. The effect is to hold the frame members 14 and 16 two inches farther apart than they were when the parts were in the position illustrated in Figure 3 of the drawings. Preferably, the abutment end 74 on the latch member 66 is beveled so as to lie flush against the abutment end 80 when the parts are in the extended position as shown in Figure 5. The point of contact between the abutment ends 74 and 80 lies substantially above a line such as line 82 in Figure 5 passing through the pivot axis 84 of latch member 66. Tensioning of the blade 20 by operation of the wing nut 62, forces the projection 78 against the latch member 66, tending to rotate the latch member 66 clockwise about the pivot axis 84, as viewed in Figure 5. Such rotation of latch member 66 is prevented by the upper wall 36 of the tube 18. Accordingly, the frame members 14 and 16 are held firmly in the extended position by the latch member 66.

In the embodiment shown, means in the form of a flat, leaf type spring 86 is provided to prevent the telescoping parts of the saw frame from separating once they are assembled, while at the same time permitting the parts to be moved from one position to another to receive blades of different length. The spring also serves as a friction brake, as will shortly be explained. One end of spring 86 is shaped into cylindrical form to provide an attachment portion 88 received in a part-cylindrical groove 90 formed in the upper surface of the projection 30 and extending transversely with respect thereto. The hook 70 is relieved to provide space to receive the spring 86 between the projection 30 and the wall 36 of the tube 18. The other end of the spring 86 extends beyond the end of the projection 78 of the frame member 14 and overlies the top of the projection 78 to be confined between the wall 36 of the tube 18 and the projection 78. The outer end of the spring 86 is bent back upon itself to form a catch portion 92 which lies in an elongated slot 94 formed in the upper surface of the leg 40, as viewed in Figures 3 and 5. Slot 94 has a length slightly greater than the sum of two inches and the length of the catch portion 92. This accommodates movement of the leg 40 toward and away from the frame member 16.

As is best illustrated by broken lines in Figure 5 of the drawings, the spring 86 before insertion in operative position is provided with a set urging the catch portion 92 upwardly. Accordingly, when the spring 86 is confined between the tube 18 and the projection 78, it tends to bear downwardly upon the adjacent upper surface of projection 78 as viewed in Figure 5. It is this contact between the spring 86 and the projection 78 which brakes or retards movement of the leg 40 within tube 18, while the catch portion 92 serves to limit the distance that the leg 40 can be withdrawn from the tube 18 because the end thereof contacts a shoulder 96 formed on the projection 78.

The various parts described above, including frame members 14 and 16, tube 18, latch 66 and spring 86, are all held in operative position by the interconnection between the frame member 16 and the tube 18. In assembling the hacksaw frame of this invention, the pivot portion 68 of the latch member 66 is inserted in the part-cylindrical recess formed by the surface 64 of the frame member 30, and attachment portion 88 of the spring 86 is placed within the groove 90 of frame member 16. Tube 18 is then slipped over the ends of the latch member 66 and the spring 86 and is seated against the shoulder of the projection 30 on the frame member 16 provided therefor. Frame member 16 and the tube 18 are then welded, grazed or otherwise assembled whereby to lock latch member 66 and the spring 86 in assembled condition.

The leg 40 of frame member 14 is then inserted into the tube 18. The upper leading corner of the projection 78 is rounded as at 98 whereby to facilitate the camming of the catch portion 92, over the projection 78 during assembly. Projection 78 is forced past catch portion 92 whereby to seat the catch portion in the slot 94, whereupon the parts are in assembled relationship. Assembly is thus accomplished without the use of rivets, pins, shafts or the like, and assembly is achieved with ease and economy of manufacture and assembly.

As illustrated in Figures 1 and 3 of the drawings, the hacksaw frame is adjusted to receive a short blade such as a standard 10 inch blade. More specifically, the abutment end 74 of the latch member 66 is in engagement with the shoulder 76 on the frame member 14. After placing a blade 20 on the blade retainers and after tightening of the wing nut 62, frame members 14 and 16 are urged toward each other whereby to provide a firm engagement between the leg 40 and the latch member 66. It is to be noted that, with the parts in this position, the abutment end 80 of the leg 40 is spaced a short distance away from the adjacent end of the hook 70 of the frame member 16 whereby to permit and accommodate variations in tolerances of the parts during manufacture. The frame in this position provides a firm support for tensioning the blade 20 and to hold the blade 20 in proper operative position.

When it is desired to use a longer blade, such as a 12 inch blade, the shorter blade is first removed by loosening the wing nut 62. The entire frame is then inverted to the position illustrated in Figure 4 and particularly the dotted line portions thereof. With the blade 20 removed, frame member 14 can now be moved to the left (as viewed in Figure 4) with respect to the tube 18. The presence of the spring 86 guides and smooths movement of the parts at this time, and when the frame member 14 reaches the position shown in full lines in Figure 4, the latch member 66 moves under the urging of the gravitational forces to the position indicated by full lines. More specifically, the latch member 66 pivots in a counter-clockwise direction about the axis of rotation 84 thereof. This brings the abutment end 74 opposite the abutment end 80. The desired new blade 20 is then placed in position upon the blade retainers and the wing nut 62 is tightened against cylindrical portion 56. This serves to force the leg 40 of the frame member 14 against the finger 72 of the latching member 66. Since the point of contact between the abutment ends 74 and 80 is below the plane 82 passing through the axis of rotation 84 of latch member 66, continued urging of the frame member 14 tends to rotate the latch member 66 in a counter-clockwise direction as viewed in Figure 4. Such movement is prevented by contact of the finger 72 with the spring 86 and tube wall 36. Accordingly, the frame is rigidly held in the extended position (Fig. 2) so as to provide good support for a longer hacksaw blade 20, and the frame may then be returned to its normal upright position (Fig. 1) for normal use.

When it is desired to remove the longer or 12 inch blade and replace it with a shorter or 10 inch blade, the longer blade is removed by loosening the nut 62 while the frame is in its upright position. Sliding the frame member 14 slightly to the left and out of contact with the latch member 66, permits the latch member 66 to fall downwardly under the urging of gravity to its position seen in Figure 3. Frame member 14 may then be pushed toward the frame member 16 until the abutment end 74 engages shoulder 76, whereupon the frame is in condition to receive a shorter or 10 inch blade.

It is to be noted that the change in the length of the saw frame to accommodate different lengths of blades may be accomplished very quickly and easily without the use of any tools and without any disassembly except removal of the blade to be replaced. It will also be observed that all of the mechanical parts of the frame having to do with locking the frame in its two adjusted positions, are entirely enclosed where they will be free of dirt and protected against removal. The structure is also such that the exterior of the principal longitudinal portion of the frame is smooth and unobstructed, and without openings therein. The illustrated structure, furthermore, is substantially stronger than prior hacksaw frames that are adjustable in length. In these prior frames, the outer one of the telescoping members has ordinarily been U-shaped in cross-section so as to permit unlocking movement of one part with respect to the other. In contrast, in the present frame the outer telescoping member is tubular and has no open side or edge thereon. As a result, the frame of the present invention, while presenting a more attractive appearance and providing complete closure for the working parts, is also substantially stronger against torsional stresses than are the prior adjustable saw frames.

It will be seen that there has been provided a saw frame construction which is readily adjustable and which fulfills all of the objects and advantages set forth above. Although a preferred embodiment of the invention has been shown for purposes of illustration, it is to be understood that various changes and modifications may be made therein without departing from the spirit and scope of the appended claims.

I claim:

1. A readily adjustable saw frame for receiving saw blades of different lengths, comprising a first frame member, a tube mounted on said first frame member and extending outwardly therefrom, a latch member pivotally engaged between said first frame member and said tube for pivotal movement within said tube, a second frame member including a first leg telescopically and slidably received in said tube and a second leg extending at an angle with respect to said first leg, means on said first frame member and on said second leg to receive and hold the opposite ends of the saw blade and for tensioning the blade therebetween, said first leg having a shoulder formed thereon and positioned toward said latch member for engagement therewith to hold said frame members in a first shorter position, a projection formed on said first leg extending toward said first frame member and terminating in an abutment end, said latch member being pivotal under the urging of gravity into engagement with said abutment and upon movement of said abutment end to clear said latch member and inverting of said saw frame to hold said frame members in a second longer position, a spring retained between said first frame member and said tube and extending into a slot in said first leg, and a catch portion formed on said spring and engaging said first leg to limit withdrawal of said first leg from said tube.

2. The combination set forth in claim 1, wherein said spring is a longitudinally extending spring of the leaf-type so constructed and arranged as frictionally to engage a portion of said first leg and thereby tend to brake relative movement between said first leg and said tube.

3. A saw structure, comprising a frame assembly having spaced legs, means on said legs to receive and hold the opposite ends of a saw blade and for tensioning such blade therebetween, said frame assembly including first and second frame elements longitudinally disposed with respect to each other and being adjustable longitudinally to alter the spacing between said legs and thereby enable said legs to receive and accommodate saw blades of different lengths, said first frame element having fixed thereon a longitudinally extending sleeve slidably receiving said second frame element therein, and an elongated latch supported within said sleeve for selective movement between first and second latching positions, said second frame element having a pair of longitudinally spaced abutments therealong laterally offset from each other and being respectively and alternately engaged by said latch so that one of said abutments is engaged by said latch in the first but not in the second position thereof and so that the other of said abutments is engaged by said latch in the second but not the first position thereof, the engagement of said latch in the first position thereof with the abutment corresponding thereto being effective to establish said frame elements at the longitudinal adjustment thereof that accommodates a saw blade of one length and the engagement of said latch in the second position thereof with the abutment corresponding thereto being effective to establish said frame elements at another longitudinal adjustment thereof that accommodates a saw blade of another length.

4. The saw structure of claim 3 in which said latch is pivotally supported within said sleeve and is selectively moved between said first and second positions thereof by gravity by inverting said sleeve.

5. A saw structure, comprising a frame assembly having spaced legs, means on said legs to receive and hold the opposite ends of a saw blade and for tensioning such blade therebetween, said frame assembly including first and second frame elements axially disposed with respect to each other and being adjustable longitudinally to alter the spacing between said legs and thereby enable said legs to receive and accommodate saw blades of different lengths, said first frame element having an axially extending sleeve of generally tubular configuration secured thereto and slidably receiving said second frame element therein, and an axially elongated latch supported within said sleeve for selective movement between first and second latching positions, said second frame element having a pair of longitudinally spaced abutments therealong laterally offset from each other and being respectively and alternately engaged by said latch so that one of said abutments is engaged by said latch in the first but not the second position thereof and so that the other of said abutments is engaged by said latch in the second but not the first position thereof, the engagement of said latch in the first position thereof with the abutment corresponding thereto being effective to establish said frame elements at the longitudinal adjustment thereof that accommodates a saw blade of one length and the engagement of said latch in the second position thereof with the abutment corresponding thereto being effective to establish said frame elements at another longitudinal adjustment thereof that accommodates a saw blade of another length.

6. The saw structure of claim 5 wherein axial movement of said second frame element in said sleeve toward said first frame element is limited by engagement of said latch in either the first or second latching positions thereof with the abutment corresponding thereto, and wherein stop means secured to one of said frame elements and engaged by the other of said frame elements are provided within said sleeve for limiting axial movement of said second frame element in the direction away from said first frame element so as to prevent withdrawal of said second frame element from said sleeve.

7. The structure of claim 6 in which said stop means comprises an elongated axially extending leaf anchored at an end thereof to one of said frame elements and equipped at the other end thereof with a catch engageable with a coacting stop provided therefor by the other of said frame elements.

8. The saw structure of claim 7 in which said leaf comprises a leaf spring having a body that slidably bears against a surface of said last mentioned frame element and defines a friction brake resisting axial movement thereof.

9. A saw structure, comprising a frame assembly having spaced legs, means on said legs to receive and hold the opposite ends of a saw blade and for tensioning such blade therebetween, said frame assembly having also first and second frame elements longitudinally disposed with respect to each other and being adjustable longitudinally to alter the spacing between said legs and thereby enable said legs to receive and accommodate saw blades of different lengths, said first frame element having fixed thereon a longitudinally extending sleeve slidably receiving said second frame element therein, and an elongated latch pivotally supported at one end thereof within said sleeve and adjacent said first frame element and being constrained against longitudinal movement with respect thereto, said latch being selectively movable about the pivot axis thereof between first and second latching positions by its own weight upon selectively inverting said frame assembly to locate either said first or second positions below the other, said second frame element having a pair of longitudinally spaced abutments therealong laterally offset from each other and being respectively and alternately engaged by said latch so that one of said abutments is engaged by said latch in the first but not the second position thereof and so that the other of said abutments is engaged by said latch in the second but not the first position thereof, the engagement of said latch in the first position thereof with the abutment corresponding thereto being effective to establish said frame elements at the longitudinal adjustment thereof that accommodates a saw blade of one length and the engagement of said latch in the second position thereof with the abutment corresponding thereto being effective to establish said frame elements at another longitudinal adjustment thereof that accommodates a saw blade of another length.

10. A saw structure, comprising a frame assembly having spaced legs, means on said legs to receive and hold the opposite ends of a saw blade and for tensioning such blade therebetween, said frame assembly having also first and second frame elements longitudinally disposed with respect to each other and being adjustable longitudinally to alter the spacing between said legs and thereby enable said legs to accommodate saw blades of different lengths, said first frame element having fixed thereon a longitudinally extending sleeve slidably receiving said second frame element therein, an elongated latch pivotally supported at one end thereof within said sleeve and adjacent said first frame element and being constrained against longitudinal movement with respect thereto, said latch being selectively movable about the pivot axis thereof between first and second latching positions by its own weight upon selectively inverting said frame assembly to locate either said first or second positions below the other, said second frame element having a pair of longitudinally spaced abutments therealong laterally offset from each other and being respectively and alternately engaged by said latch so that one of said abutments is engaged by said latch in the first but not the second position thereof and so that the other of said abutments is engaged by said latch in the second but not the first position thereof, the engagement of said latch in the first position thereof with the abutment corresponding thereto being effective to establish said frame elements at the longitudinal adjustment thereof that accommodates a saw blade of one length and the engagement of said latch in the second position thereof with the abutment corresponding thereto being effective to establish said frame elements at another longitudinal adjustment thereof that accommodates a saw blade of another length, and an elongated leaf spring longitudinally disposed within said sleeve and being anchored at an end thereof to one of said frame elements and equipped at its other end with a catch engageable with a coacting stop provided therefor on the other of said frame members so as to limit axial movement of said second frame element within said sleeve in a direction away from said first frame element and thereby prevent withdrawal of said second frame element from said sleeve.

References Cited in the file of this patent

UNITED STATES PATENTS

| | | |
|---|---|---|
| 440,174 | Marston | Nov. 11, 1890 |
| 1,023,216 | McQuillan | Apr. 16, 1912 |
| 1,427,068 | Claffey | Aug. 22, 1922 |
| 1,610,381 | Jacobey | Dec. 14, 1926 |
| 2,253,440 | Martin | Aug. 19, 1941 |

FOREIGN PATENTS

| | | |
|---|---|---|
| 423,541 | France | Feb. 17, 1911 |